US012632208B2

(12) United States Patent
Zhang et al.

(10) Patent No.: US 12,632,208 B2
(45) Date of Patent: May 19, 2026

(54) METHOD FOR PROCESSING INFORMATION, NON-TRANSITORY COMPUTER-READABLE STORAGE MEDIUM, AND ELECTRONIC DEVICE

(71) Applicant: GUANGDONG OPPO MOBILE TELECOMMUNICATIONS CORP., LTD., Dongguan (CN)

(72) Inventors: Lei Zhang, Dongguan (CN); Bocheng Tan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 3 days.

(21) Appl. No.: 19/040,006

(22) Filed: Jan. 29, 2025

(65) Prior Publication Data

US 2025/0173114 A1     May 29, 2025

Related U.S. Application Data

(63) Continuation of application No. PCT/CN2023/106606, filed on Jul. 10, 2023.

(30) Foreign Application Priority Data

Sep. 1, 2022     (CN) .......................... 202211066867.8

(51) Int. Cl.
| | |
|---|---|
| *G06F 3/14* | (2006.01) |
| *G06F 3/04817* | (2022.01) |
| *G06F 3/0488* | (2022.01) |

(52) U.S. Cl.
CPC ........ *G06F 3/1454* (2013.01); *G06F 3/04817* (2013.01); *G06F 3/0488* (2013.01)

(58) Field of Classification Search
CPC .. G06F 3/1454; G06F 3/04817; G06F 3/0488; G06F 3/04847; G06F 3/04883; G06F 3/14; G09G 5/12
See application file for complete search history.

(56) References Cited

U.S. PATENT DOCUMENTS

| | | | |
|---|---|---|---|
| 9,996,367 B1 * | 6/2018 | Bao ............................ | G06F 3/14 |
| 2017/0188085 A1 * | 6/2017 | Li .................... | H04N 21/25841 |

(Continued)

FOREIGN PATENT DOCUMENTS

| | | |
|---|---|---|
| CN | 111447323 A | 7/2020 |
| CN | 112905289 A | 6/2021 |
| CN | 115437545 A | 12/2022 |

OTHER PUBLICATIONS

Chinese First Office Action, Chinese Application No. 202211066867. 8, mailed May 28, 2025 (16 pages).

(Continued)

*Primary Examiner* — Jonathan A Boyd
(74) *Attorney, Agent, or Firm* — Ladas & Parry LLP

(57)     ABSTRACT

A method for processing information, an apparatus for processing information, a non-transitory computer-readable storage medium, and an electronic device are provided. The method is performed by a first electronic device and includes: in response to a touch operation applied on a cross-screen projection icon of a cross-screen projection application, establishing a screen projection channel with a second electronic device and sending switching indication information to the second electronic device; receiving screen projection data generated by the cross-screen projection application and sent from the second electronic device through the screen projection channel; and playing the screen projection data.

20 Claims, 4 Drawing Sheets

(56)　　　　　References Cited

U.S. PATENT DOCUMENTS

| | | | |
|---|---|---|---|
| 2020/0057596 A1* | 2/2020 | Kim | G06F 3/0482 |
| 2022/0283828 A1* | 9/2022 | Qi | G06F 3/0488 |
| 2022/0365740 A1* | 11/2022 | Chang | G06F 3/0488 |

OTHER PUBLICATIONS

International Search Report and Written Opinion, International Patent Application No. PCT/CN2023/106606, mailed Oct. 18, 2023 (11 pages).

* cited by examiner

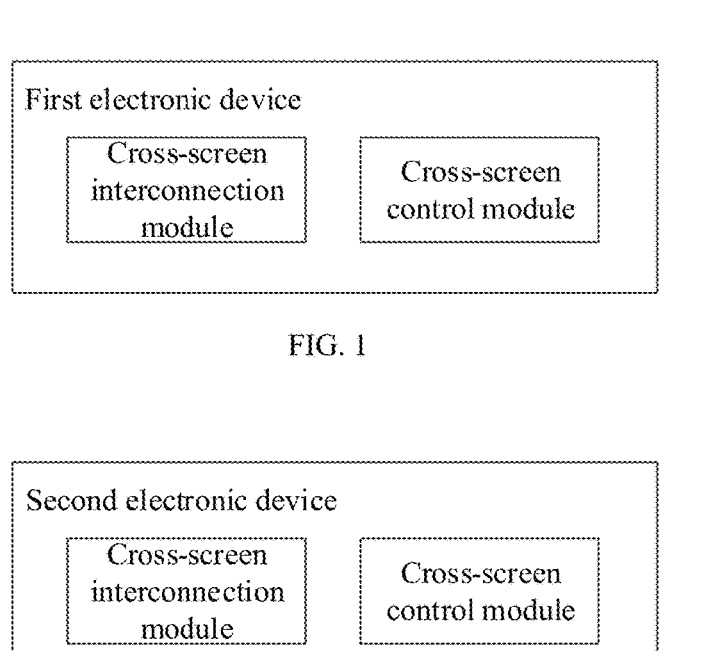

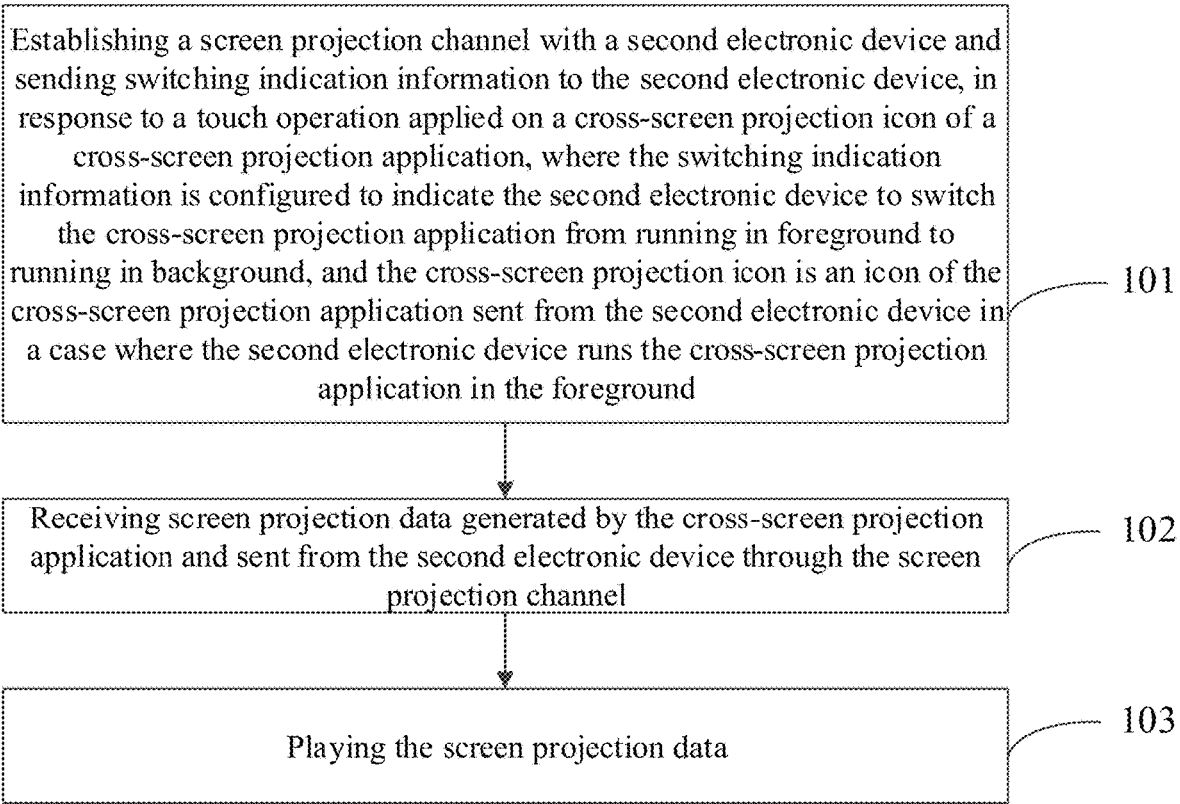

Establishing a screen projection channel with a second electronic device and sending switching indication information to the second electronic device, in response to a touch operation applied on a cross-screen projection icon of a cross-screen projection application, where the switching indication information is configured to indicate the second electronic device to switch the cross-screen projection application from running in foreground to running in background, and the cross-screen projection icon is an icon of the cross-screen projection application sent from the second electronic device in a case where the second electronic device runs the cross-screen projection application in the foreground — 101

Receiving screen projection data generated by the cross-screen projection application and sent from the second electronic device through the screen projection channel — 102

Playing the screen projection data — 103

FIG. 3

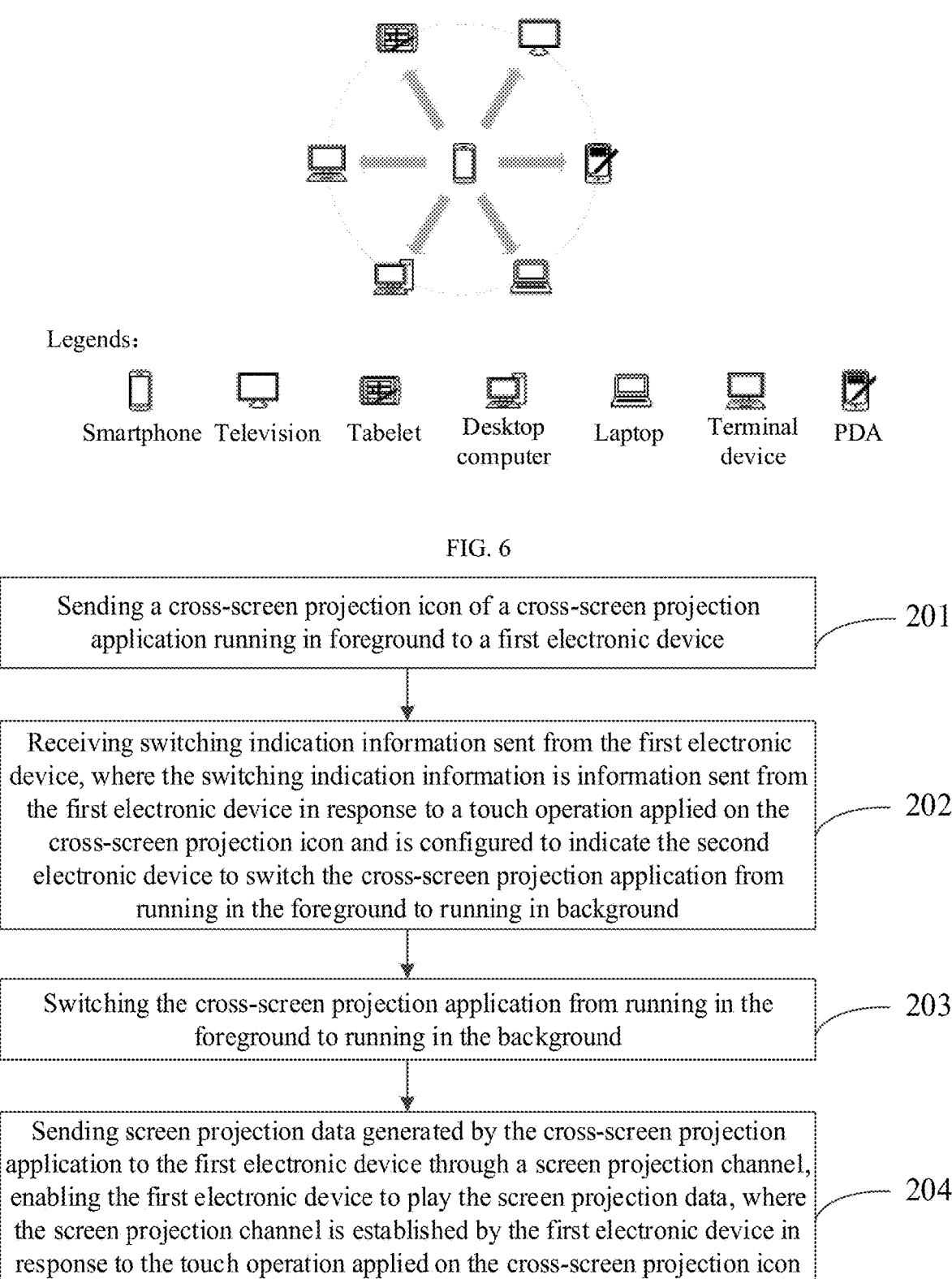

Legends:

Smartphone  Television  Tabelet  Desktop computer  Laptop  Terminal device  PDA

FIG. 6

| Sending a cross-screen projection icon of a cross-screen projection application running in foreground to a first electronic device | 201 |

| Receiving switching indication information sent from the first electronic device, where the switching indication information is information sent from the first electronic device in response to a touch operation applied on the cross-screen projection icon and is configured to indicate the second electronic device to switch the cross-screen projection application from running in the foreground to running in background | 202 |

| Switching the cross-screen projection application from running in the foreground to running in the background | 203 |

| Sending screen projection data generated by the cross-screen projection application to the first electronic device through a screen projection channel, enabling the first electronic device to play the screen projection data, where the screen projection channel is established by the first electronic device in response to the touch operation applied on the cross-screen projection icon | 204 |

FIG. 7

METHOD FOR PROCESSING INFORMATION, NON-TRANSITORY COMPUTER-READABLE STORAGE MEDIUM, AND ELECTRONIC DEVICE

CROSS REFERENCE TO RELATED APPLICATIONS

This application is a continuation of International Patent Application No. PCT/CN2023/106606, filed on Jul. 10, 2023, which claims priority to China Patent Applicant No. 202211066867.8, filed on Sep. 1, 2022, the entire contents of which are incorporated herein by reference.

TECHNICAL FIELD

Embodiments of the present disclosure relate to the field of electronic technologies, in particular, to a method for processing information, a non-transitory computer-readable storage medium, and an electronic device.

BACKGROUND

With a development of electronic technologies, electronic devices such as smart phones or first electronic devices, e.g., computers, have been widely used and been developed to include more and more functions, thereby becoming an essential part of people's daily lives.

SUMMARY

Some embodiments of the present disclosure provide a method for processing information, a non-transitory computer-readable storage medium, and an electronic device.

In a first aspect, some embodiments of the present disclosure provide a method for processing information, which is performed by a first electronic device. The method may include the following operations:

establishing a screen projection channel with a second electronic device and sending switching indication information to the second electronic device, in response to a touch operation applied on a cross-screen projection icon of a cross-screen projection application, where the switching indication information is configured to indicate the second electronic device to switch the cross-screen projection application from running in foreground to running in background, and the cross-screen projection icon is an icon of the cross-screen projection application sent from the second electronic device in a case where the second electronic device runs the cross-screen projection application in the foreground;

receiving screen projection data generated by the cross-screen projection application and sent from the second electronic device through the screen projection channel; and playing the screen projection data.

In a second aspect, some embodiments of the present disclosure provide a non-transitory computer-readable storage medium. The non-transitory computer-readable storage medium may store a computer program which, when executed by a computer, causes the computer to perform an operation in the method for processing information provided by some embodiments of the present disclosure.

In a third aspect, some embodiments of the present disclosure further provide an electronic device. The electronic device may include a memory and a processor. The memory may store a computer program which, when executed by the processor, causes the processor to perform an operation in the method for processing information provided by some embodiments of the present disclosure.

BRIEF DESCRIPTION OF THE DRAWINGS

The following illustrates some embodiments of the present disclosure in detail in combination with figures, making both the technical solutions and the technical effects of some embodiments of the present disclosure to be obvious.

FIG. 1 is a schematic view of a first electronic device in some embodiments of the present disclosure.

FIG. 2 is a schematic view of a second electronic device in some embodiments of the present disclosure.

FIG. 3 is a flowchart of a method for processing information in some embodiments of the present disclosure.

FIG. 6 is a schematic view illustrating types of a first electronic device and a second electronic device in some embodiments of the present disclosure.

FIG. 7 is a flowchart of another method for processing information in some embodiments of the present disclosure.

DETAILED DESCRIPTION

Figure 4:
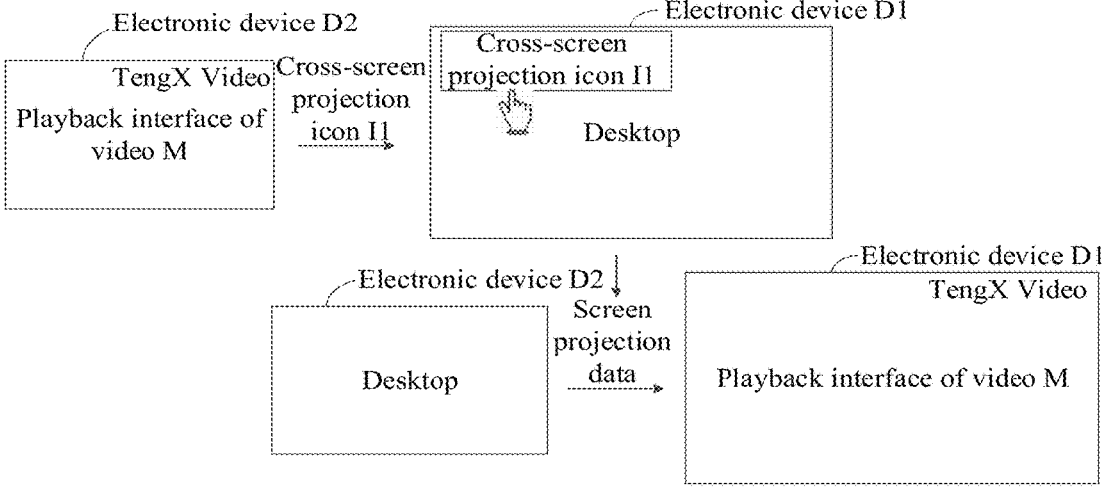
FIG. 4 is a schematic view illustrating a first scenario of a method for processing information in some embodiments of the present disclosure.

As shown in the figures, same component symbols denote same components. The principles of the present disclosure are exemplified by implementation in a suitable computing environment. The following description is based on illustrated embodiments of the present disclosure, which should not be construed as limiting other embodiments of the present disclosure that are not detailed herein.

With a development of electronic technologies, electronic devices such as smart phones or first electronic devices, e.g., computers, have been widely used and been developed to include more and more functions, thereby becoming an essential part of people's daily lives. Currently, there is a common need for people to view content generated by one electronic device on another electronic device. Therefore, a solution that enables one electronic device to display content generated by another device is desired.

As shown in FIG. 1, FIG. 1 is a schematic view of a first electronic device in some embodiments of the present disclosure.

The first electronic device includes a cross-screen interconnection module and a cross-screen control module.

The cross-screen interconnection module is configured to provide inter-device functions, such as scanning, discovering, and connecting. For example, the first electronic device is configured to establish a data connection, such as a peer-to-peer (P2P) connection or a Bluetooth connection, etc., with a cross-screen interconnection module of a second electronic device through the cross-screen interconnection module thereof.

The cross-screen control module is configured to establish a channel for transmitting corresponding data between devices to enable an inter-device data transmission. For example, the first electronic device establishes a screen projection channel between the cross-screen control module of the first electronic device and a cross-screen control module of the second electronic device with the second electronic device through the cross-screen control module thereof based on the data connection, which allows or enables the first electronic device to receive screen projection data generated by the second electronic device through the screen projection channel. The first electronic device establishes an information channel between the cross-screen control module of the first electronic device and the cross-screen control module of the second electronic device with the second electronic device through the cross-screen control module thereof based on the data connection, which allows or enables the first electronic device to receive application information of an application, such as an icon, a badge, an application package name, etc., sent from the second electronic device through the information channel.

The cross-screen control module may be further configured to process the data transmitted between devices. For example, the cross-screen control module may be configured to display the received screen projection data, perform reverse control over the received screen projection data, and display the received application information, etc.

As shown in FIG. 2, FIG. 2 is a schematic view of a second electronic device in some embodiments of the present disclosure.

The second electronic device includes a cross-screen interconnection module and a cross-screen control module.

The cross-screen interconnection module is configured to provide inter-device functions, such as scanning, discovering, and connecting. For example, the first electronic device is configured to establish a data connection, such as a P2P connection or a Bluetooth connection, etc., with the cross-screen interconnection module of the second electronic device through the cross-screen interconnection module thereof.

The cross-screen control module is configured to establish a channel for transmitting corresponding data between devices to enable an inter-device data transmission. For example, the first electronic device establishes the screen projection channel between the cross-screen control module of the first electronic device and the cross-screen control module of the second electronic device with the second electronic device through the cross-screen control module thereof based on the data connection, which allows or enables the second electronic device to send generated screen projection data through the screen projection channel to the first electronic device. The first electronic device establishes the information channel between the cross-screen control module of the first electronic device and the cross-screen control module of the second electronic device with the second electronic device through the cross-screen control module thereof based on the data connection, which allows or enables the second electronic device to send application information of an application, such as an icon, a badge, an application package name, etc., to the first electronic device through the information channel.

As shown in FIG. 3, FIG. 3 is a flowchart of a method for processing information in some embodiments of the present disclosure. The method may be performed by the first electronic device and may include the following operations.

At operation 101: establishing a screen projection channel with a second electronic device and sending switching indication information to the second electronic device, in response to a touch operation applied on a cross-screen projection icon of a cross-screen projection application, where the switching indication information is configured to indicate the second electronic device to switch the cross-screen projection application from running in foreground to running in background, and the cross-screen projection icon is an icon of the cross-screen projection application sent from the second electronic device in a case where the second electronic device runs the cross-screen projection application in the foreground.

For example, when the first electronic device and second electronic device are within a preset communication range, the first electronic device establishes the data connection, such as the P2P connection or the Bluetooth connection, etc., with the cross-screen interconnection module of the second electronic device through the cross-screen interconnection module thereof. After the data connection is established, the first electronic device establishes the information channel between the cross-screen control module of the first electronic device and the cross-screen control module of the second electronic device with the second electronic device through the cross-screen control module thereof based on the data connection. In a case where the second electronic device runs a cross-screen projection application in the foreground, the second electronic device sends the application information of the cross-screen projection application, such as a cross-screen projection icon, a cross-screen projection badge, and a cross-screen projection application package name, etc., to the first electronic device through the information channel. Thus, the first electronic device receives the application information of the cross-screen projection application, such as the cross-screen projection icon, the cross-screen projection badge, and the cross-screen projection application package name, etc., sent from the second electronic device through the information channel. After the application information of the cross-screen projection application, such as the cross-screen projection icon, the cross-screen projection badge, and the cross-screen projection application package name, etc., sent from the second electronic device is received, the first electronic device may display the application information of the cross-screen projection application. For example, the first electronic device may display the cross-screen projection icon of the cross-screen projection application through a screen. For another example, the first electronic device may display the cross-screen projection icon of the cross-screen projection application through a status bar.

The cross-screen projection application may be any application installed on the second electronic device. The cross-screen projection icon is an icon of the cross-screen projection application. The cross-screen projection badge is a badge of the cross-screen projection application. The cross-screen projection application package name is a package name of the cross-screen projection application. For example, the cross-screen projection application may be a TengX Video, the cross-screen projection icon is an icon of the TengX Video, the cross-screen projection badge is a badge of the TengX Video, and the cross-screen projection application package name is a package name of the TengX Video.

In some embodiments, the cross-screen projection application may be an application installed on the second electronic device. In this case, the particular application set as the cross-screen projection application may be configured by the user or determined by the electronic device based on certain rules.

It should be noted that in a case where the cross-screen projection application does not run in the foreground, the first electronic device may hide the cross-screen projection icon of the cross-screen projection application. In this case, when the cross-screen projection application running in the foreground is switched from an application A1 to an application A2 on the electronic device, the cross-screen projection icon displayed on the first electronic device correspondingly switches from a cross-screen projection icon of the application A1 to a cross-screen projection icon of the application A2.

When the user wants to play the application data generated during the running of the cross-screen projection application as screen projection data on the first electronic device, the user may perform a touch operation, such as clicking on the cross-screen projection icon. The first electronic device then receives the touch operation applied on or performed on the cross-screen projection icon of the cross-screen projection application. In response to the touch operation, the first electronic device establishes the screen projection channel with the second electronic device, which enables or allows the second electronic device to send the application data generated by the cross-screen projection application as the screen projection data to the first electronic device through the screen projection channel, enabling the first electronic device to play the screen projection data.

It can be understood that when the application data generated by the cross-screen projection application is played as the screen projection data on the screen of the first electronic device, the application data of the cross-screen projection application no longer needs to be played on the screen of the second electronic device. Therefore, in response to the touch operation, the first electronic device may further be configured to send the switching indication information to the second electronic device, indicating the second electronic device to switch the cross-screen projection application from running in the foreground to running in the background. After the second electronic device receives the switching indication information, the second electronic device may switch the cross-screen projection application from running in the foreground to running in the background.

At operation 102: receiving screen projection data generated by the cross-screen projection application and sent from the second electronic device through the screen projection channel.

At operation 103: playing the screen projection data.

For example, when the screen projection channel between the first electronic device and the second electronic device is successfully established, the second electronic device sends the screen projection data generated by the cross-screen projection application to the first electronic device through the screen projection channel. As a result, the first electronic device receives the screen projection data generated by the cross-section projection application and sent from the second electronic device through the screen projection channel. After the first electronic device receives the screen projection data, the first electronic device may play the screen projection data.

For example, as shown in FIG. 4, assuming that the cross-screen projection application is the TengX Video, the first electronic device is an electronic device D1, and the second electronic device is an electronic device D2, the electronic device D2 plays a video M through the TengX Video on the electronic device D2, so that the electronic device D2 displays a playback interface of the video M. After a data connection is established between the electronic device D1 and the electronic device D2, and an information channel is further established based on the data connection, the electronic device D2 sends the icon of the TengX Video as a cross-screen projection icon I1 to the electronic device D1 through the information channel. The electronic device D1 then displays the cross-screen projection icon I1. After the user clicks on the cross-screen projection icon I1, the electronic device D1 establishes the screen projection channel with the electronic device D2. The electronic device D2 then sends the screen projection data generated by the TengX Video on the electronic device D2 to the electronic device D1 through the screen projection channel. It can be understood that the screen projection data generated by the TengX Video on the electronic device D2 is data to be played for the video M. Therefore, after the electronic device D1 receives the screen projection data, the electronic device D1 may play the screen projection data, i.e., playing data of the video M that has not been played yet. As a result, the electronic device D1 displays the playback interface of the video M, thereby continuing to play the remaining part of the video M on the electronic device D1. In some embodiments, when a display state of the electronic device D1 is in a landscape mode, the electronic device D1 may play the screen projection data in full screen. When the display state of device D1 is in a portrait mode, the electronic device D1 may prompt the user to switch to the landscape mode and then play the screen projection data in the full screen. In a case where the user does not switch the display state of the electronic device D1 to the landscape mode, the electronic device D1 may determine a playback resolution of the screen projection data on the electronic device D1 based on a playback resolution of the screen projection data on the electronic device D2 and play the screen projection data using the playback resolution of the screen projection data on the electronic device D2.

In the above embodiments, in response to a touch operation applied on a cross-screen projection icon of a cross-screen projection application, a screen projection channel is established with a second electronic device and switching indication information is sent to the second electronic device. The switching indication information is configured to indicate the second electronic device to switch the cross-screen projection application from running in foreground to running in background. The cross-screen projection icon is an icon of the cross-screen projection application sent from the second electronic device in a case where the second electronic device runs the cross-screen projection application in the foreground. Screen projection data generated by the cross-screen projection application and sent from the second electronic device is received through the screen projection channel. The screen projection data is played. Therefore, when the user touches the cross-screen projection icon, the second electronic device may send the screen projection data generated by the cross-screen projection application on the second electronic device to the first electronic device. The first electronic device, upon receiving the screen projection data, may play the received screen projection data, thereby enabling the content generated by one electronic device to be displayed on another electronic device.

In some embodiments, the method for processing information may further include the following operations:

sending a first data acquisition request to the second electronic device, in response to a touch operation applied on a cross-screen synchronization icon of a cross-screen synchronization application, where the cross-screen synchronization icon is an icon of the cross-screen synchronization application sent from the second electronic device in a case where the second electronic device runs the cross-screen synchronization application in the foreground;

receiving first to-be-synchronized data generated by the cross-screen synchronization application and sent from the second electronic device based on the first data acquisition request; and synchronizing the first to-be-synchronized data to a synchronization application on the first electronic device that corresponds to the cross-screen synchronization application.

For example, when the first electronic device and second electronic device are within the preset communication range, the first electronic device establishes the data connection, such as the P2P connection or the Bluetooth connection, etc., with the cross-screen interconnection module of the second electronic device through the cross-screen interconnection module thereof. After the data connection is established, the first electronic device establishes an information channel between the cross-screen control module of the first electronic device and the cross-screen control module of the second electronic device with the second electronic device through the cross-screen control module thereof based on the data connection. In a case where the second electronic device runs a cross-screen synchronization application in the foreground, the second electronic device sends the application information of the cross-screen synchronization application, such as the cross-screen synchronization icon, the cross-screen synchronization badge, and the cross-screen synchronization application package name, etc., to the first electronic device through the information channel. Thus, the first electronic device receives the application information of the cross-screen synchronization application, such as the cross-screen synchronization icon, the cross-screen synchronization badge, and the cross-screen synchronization application package name, etc., sent from the second electronic device through the information channel. After the application information of the cross-screen synchronization application, such as the cross-screen synchronization icon, the cross-screen synchronization badge, and the cross-screen synchronization application package name, etc., sent from the second electronic device is received, the first electronic device may display the application information of the cross-screen synchronization application. For example, the first electronic device may display the cross-screen synchronization icon of the cross-screen synchronization application through the screen. For another example, the first electronic device may display the cross-screen synchronization icon of the cross-screen projection synchronization through the status bar.

The cross-screen synchronization application may be an application installed on the second electronic device. In this case, the particular application set as the cross-screen synchronization application may be configured by the user or determined by the electronic device based on certain rules. The cross-screen synchronization icon is an icon of the cross-screen synchronization application. The cross-screen synchronization badge is a badge of the cross-screen synchronization application. The cross-screen synchronization application package name is a package name of the cross-screen synchronization application. For example, the cross-screen synchronization application may be a Notes, the cross-screen synchronization icon may be an icon of the Notes, the cross-screen synchronization badge may be a badge of the Notes, and the cross-screen synchronization application package name may be a package name of the Notes.

When the user wants to synchronize the application data generated during the running of the cross-screen synchronization application as the first to-be-synchronized data to a synchronization application corresponding to the cross-screen synchronization application on the first electronic device, the user may perform a touch operation, such as clicking on the cross-screen synchronization icon. The first electronic device then receives the touch operation on the cross-screen synchronization icon of the cross-screen synchronization application. In response to the touch operation, the first electronic device sends the first data acquisition request to the second electronic device, which allows or enables the second electronic device to send the first to-be-synchronized data generated by the cross-screen synchronization application to the first electronic device based on the first data acquisition request. After the second electronic device receives the first data acquisition request, the second electronic device may send the first to-be-synchronized data generated by the cross-screen synchronization application to the first electronic device. After the first electronic device receives the first to-be-synchronized data, the first electronic device may synchronize the first to-be-synchronized data to the synchronization application corresponding to the cross-screen synchronization application on the first electronic device.

The synchronization application may be an application installed on the first electronic device that corresponds to the cross-screen synchronization application. For example, both the cross-screen synchronization application and the synchronization application may be the Notes, a photo album, etc.

For example, assuming that the cross-screen synchronization application is the Notes and the user has edited content through the Notes, after the user clicks on the cross-screen synchronization icon of the Notes, the second electronic device may send the content edited by the user in real-time to the first electronic device, allowing the first electronic device to synchronize the corresponding content to the Notes on the first electronic device, thereby realizing a synchronization of the edited content from the Notes on the second electronic device to the Notes on the first electronic device.

In some embodiments, the second electronic device may send the first to-be-synchronized data to cloud, and the first electronic device may then retrieve the first to-be-synchronized data from the cloud, thereby realizing the synchronization of the first to-be-synchronized data to the synchronization application on the first electronic device.

In some embodiments, the method for processing information may further include the following operations:

receiving a touch operation applied on a cross-screen icon of a cross-screen application, where the cross-screen icon is an icon of the cross-screen application sent from the second electronic device in a case where the second electronic device runs the cross-screen icon on the foreground; and determining that the touch operation applied on the cross-screen synchronization icon of the cross-screen synchronization application is received, in a case where a local application corresponding to the cross-screen application exists on the first electronic device.

It can be understood that the cross-screen application is an application installed on the second electronic device. In a case where the second electronic device runs the cross-screen application in the foreground, the second electronic device may send the icon of the cross-screen application as the cross-screen icon to the first electronic device through the information channel. After the first electronic device receives the cross-screen icon, the first electronic device may display the icon in the status bar. When the user clicks on the cross-screen icon, the first electronic device may detect whether a local application corresponding to the cross-screen application exists on the first electronic device. In a case where the local application corresponding to the cross-screen application exists on the first electronic device, the first electronic device determines that the touch operation applied on or performed on the cross-screen synchronization icon of the cross-screen synchronization application is received. In other words, when the local application corresponding to the cross-screen application exists on the first electronic devices, the cross-screen application becomes the cross-screen synchronization application, and the cross-screen icon becomes the cross-screen synchronization icon. Thus, in response to the touch operation, the first electronic device may send the first data acquisition request to the second electronic device, enabling the second electronic device to send the first to-be-synchronized data generated by the cross-screen projection application to the first electronic device. After the first electronic device receives the first to-be-synchronized data, the first electronic device may synchronize the first to-be-synchronized data to the local application corresponding to the cross-screen synchronization application, that is, the local application corresponding to the cross-screen application. The local application corresponding to the cross-screen application is the same application as the cross-screen application, such as the Notes, the photo album, etc.

For example, assuming that the cross-screen application is the Notes, when the Notes exists on the first electronic device, the second electronic device may send content generated by the Notes on the second electronic device to the first electronic device, allowing the first electronic device to synchronize the content to the Notes on the first electronic device.

In some embodiments, after the receiving a touch operation applied on a cross-screen icon of a cross-screen application, the method may further include the following operations:

determining that the touch operation applied on the cross-screen projection icon of the cross-screen projection application is received, in a case where a local application corresponding to the cross-screen application does not exist on the first electronic device and the cross-screen application does not support a browser synchronization mode.

For example, in a case where no corresponding local application for the cross-screen application exists on the first electronic device, when the cross-screen application supports the browser synchronization mode, the first electronic device may synchronize the content generated by the cross-screen application to the browser on the first electronic device. However, when the cross-screen application does not support the browser synchronization mode, the first electronic device may play the application data generated by the cross-screen application by means of screen projection. In other words, when no corresponding local application for the cross-screen application exists on the first electronic device and the cross-screen application does not support the browser synchronization mode, the first electronic device determines that the touch operation applied on or performed on the cross-screen projection icon of the cross-screen projection application is received. That is, when no corresponding local application for the cross-screen application exists on the first electronic device and the cross-screen application does not support the browser synchronization mode, the cross-screen application becomes the cross-screen projection application, and the cross-screen icon becomes the cross-screen projection icon. Thus, in response to the touch operation, the first electronic device may indicate the second electronic device to send the screen projection data generated by the cross-screen projection application to the first electronic device. After the first electronic device receives the screen projection data, the first electronic device may then play the projection data.

In some embodiments, after the receiving a touch operation applied on a cross-screen icon of a cross-screen application, the method may further include the following operations:

sending a second data acquisition request to the second electronic device, in a case where a local application corresponding to the cross-screen application does not exist on the first electronic device and the cross-screen application supports a browser synchronization mode;

receiving second to-be-synchronized data generated by the cross-screen application and sent from the second electronic device based on the second data acquisition request; and synchronizing the second to-be-synchronized data to a browser on the first electronic device.

For example, in a case where no corresponding local application for the cross-screen application exists on the first electronic device, when the cross-screen application supports the browser synchronization mode, the first electronic device may synchronize the content generated by the cross-screen application to the browser on the first electronic device. In other words, when no corresponding local application for the cross-screen application exists on the first electronic device and the cross-screen application supports the browser synchronization mode, the second data acquisition request may be sent to the second electronic device. After the second electronic device receives the second data acquisition request, the second electronic device may send the second to-be-synchronized data generated by the cross-screen application to the first electronic device based on the second data acquisition request. After the first electronic device receives the second to-be-synchronized data, the first electronic device may synchronize the data to the browser on the first electronic device, allowing the user to view the second to-be-synchronized data in the browser on the first electronic device.

In some embodiments, the method for processing information may further include the following operation:

launching a synchronization application, in response to the touch operation applied on the cross-screen synchronization icon of the cross-screen synchronization application.

In some embodiments, after the synchronizing the first to-be-synchronized data to the synchronization application on the first electronic device that corresponds to the cross-screen synchronization application, the method may further include the following operation:

displaying the first to-be-synchronized data through application interface of the synchronization application.

For example, in response to a touch operation applied on or performed on the cross-screen synchronization icon of the cross-screen synchronization application, the first electronic device sends the first data acquisition request to the second electronic device and further launches the synchronization application corresponding to the cross-screen synchronization application to display relevant information, such as "Application is loading." After the first to-be-synchronized data is synchronized to the synchronization application, the first electronic device displays the first to-be-synchronized data through the application interface of the synchronization application, allowing the user to view and process the first to-be-synchronized data on the first electronic device.

Figure 5:
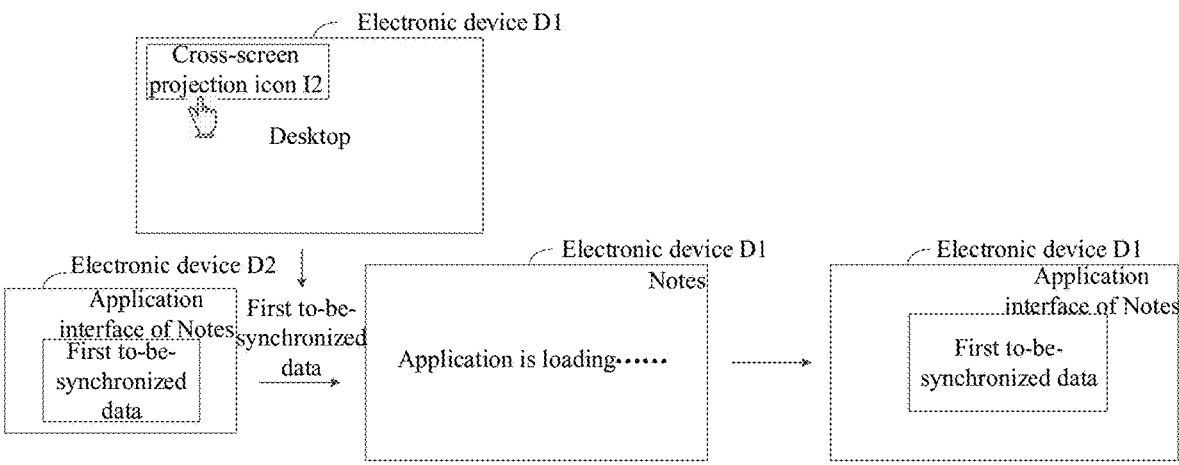
FIG. 5 is a schematic view illustrating a second scenario of a method for processing information in some embodiments of the present disclosure.

For example, as shown in FIG. 5, assuming that the cross-screen synchronization application is the Notes, the first electronic device is the electronic device D1, and the second electronic device is the electronic device D2, in response to a touch operation applied on or performed on a cross-screen synchronization icon I2 of the Notes, the electronic device D1, in addition to launching the Notes and displaying "Application is loading . . . ", sends the first data acquisition request to the electronic device D2. The electronic device D2 sends the first to-be-synchronized data generated by the Notes on the electronic device D2 to the electronic device D1. The electronic device D1 synchronizes the first to-be-synchronized data to the Notes on the electronic device D1. After the first to-be-synchronized data is synchronized to the Notes on the electronic device D1, the electronic device D1 displays the application interface of the Notes on the electronic device D1 and further displays the first to-be-synchronized data on the application interface, allowing the user to continue editing the first to-be-synchronized data, such as modifying the first to-be-synchronized data or adding new content, etc., on the application interface.

In some embodiments, the method for processing information may further include the following operations:

displaying a relay on hold icon and starting timekeeping, where the relay on hold icon is an icon of a relay on hold application sent from the second electronic device in a case where the second electronic device launches the relay on hold application;

hiding the relay on hold icon and receiving application data generated by the relay on hold application and sent from the second electronic device, in a case where the timekeeping reaches a preset duration; and processing the application data.

For example, an application on the second electronic device may be preset as the relay on hold application. After the information channel is established between the first electronic device and the second electronic device, when the second electronic device launches the relay on hold application, the second electronic device sends the icon of the relay on hold application as the relay on hold icon to the first electronic device. The first electronic device may display the relay on hold icon in the status bar. The first electronic device may further display a countdown next to the relay on hold icon to indicate time remaining before the relay on hold icon hides and time when the application data generated by the relay on hold application will be sent to the first electronic device. When the relay on hold icon is displayed, the first electronic device may start timekeeping. When the timekeeping reaches the preset duration, the first electronic device may hide the relay on hold icon and receive the application data generated by the relay on hold application sent from the second electronic device. After the first electronic device receives the application data, the first electronic device may play the application data as the screen projection data, or may synchronize the application data to a local application corresponding to the relay on hold application on the first electronic device, or may synchronize the application data to the browser on the first electronic device, thereby enabling the first electronic device to display the application data generated by the relay on hold application on the second electronic device after the preset duration.

The relay on hold application may be any application installed on the second electronic device. The relay on hold icon is the icon of the relay on hold application. For example, the relay on hold application may be the TengX Video, and the relay on hold icon may be the icon of the TengX Video.

In some embodiments, the relay on hold application may an application installed on the second electronic device. In this case, the particular application set as the relay on hold application may be configured by the user or determined by the electronic device based on certain rules.

In some embodiments, as shown in FIG. 6, the first electronic device in some embodiments of the present disclosure may be a smartphone (first electronic device) and the second electronic device in some embodiments of the present disclosure may be a television, a tablet, a desktop computer, a laptop, a terminal device, or a personal digital assistant (PDA) (second electronic device).

In some embodiments, the first electronic device in some embodiments of the present disclosure may be at least one of a smartphone, a television, a tablet, a desktop computer, a laptop, a terminal device, or a PDA (first electronic device). The second electronic device in some embodiments of the present disclosure may be at least one of a smartphone, a television, a tablet, a desktop computer, a laptop, a terminal device, or a PDA (second electronic device). In this way, an one-to-many cross-end interconnection, a many-to-one cross-end interconnection, and a many-to-many cross-end interconnection may be realized.

As shown in FIG. 7, FIG. 7 is a flowchart of another method for processing information in some embodiments of the present disclosure. The method may be performed by the second electronic device and may include the following operations.

At operation 201: sending a cross-screen projection icon of a cross-screen projection application running in foreground to a first electronic device.

At operation 202: receiving switching indication information sent from the first electronic device, where switching indication information is information sent from the first electronic device in response to a touch operation applied on the cross-screen projection icon and is configured to indicate the second electronic device to switch the cross-screen projection application from running in the foreground to running in background.

At operation 203: switching the cross-screen projection application from running in the foreground to running in the background.

At operation 204: sending screen projection data generated by the cross-screen projection application to the first electronic device through a screen projection channel, enabling the first electronic device to play the screen projection data, where the screen projection channel is established by the first electronic device in response to the touch operation applied on the cross-screen projection icon.

It can be understood that the operations 201 to 204 correspond to operations of a sending end. The operations 101 to 103 correspond to operations of a receiving end. The processing procedure of the sending end and the processing procedure of the receiving end are corresponding to each other. Thus, specific implementations of the operations 201 to 204 may refer to specific implementations in the previous embodiments and will not be repeated here.

Figure 8:
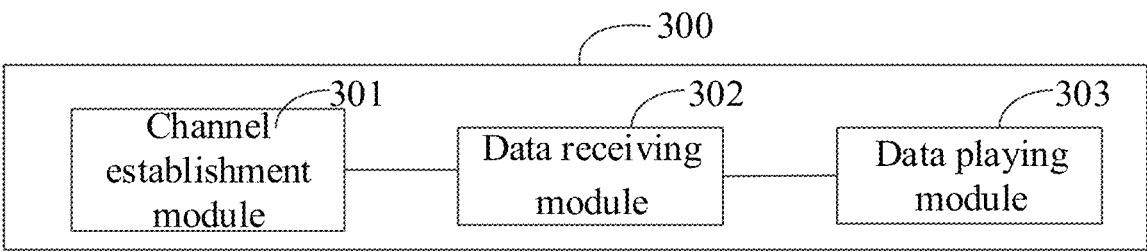
FIG. 8 is a structural block diagram of an apparatus for processing information in some embodiments of the present disclosure.

As shown in FIG. 8, FIG. 8 is a structural block diagram of an apparatus for processing information in some embodiments of the present disclosure. An apparatus 300 for processing information may be configured in the first electronic device. The apparatus 300 for processing information may include a channel establishment module 301, a data receiving module 302, and a data playing module 303.

The channel establishment module 301 may be configured to establish a screen projection channel with a second electronic device and send switching indication information to the second electronic device, in response to a touch operation applied on a cross-screen projection icon of a cross-screen projection application. The switching indication information is configured to indicate the second electronic device to switch the cross-screen projection application from running in foreground to running in background. The cross-screen projection icon is an icon of the cross-screen projection application sent from the second electronic device in a case where the second electronic device launches the cross-screen projection application.

The data receiving module 302 may be configured to receive screen projection data generated by the cross-screen projection application and sent from the second electronic device through the screen projection channel.

The data playing module 303 may be configured to play the screen projection data.

In some embodiments, the apparatus 300 for processing information may further include a request sending module and a data synchronization module. The request sending module may be configured to: send a first data acquisition request to the second electronic device, in response to a touch operation applied on a cross-screen synchronization icon of a cross-screen synchronization application. The cross-screen synchronization icon is an icon of the cross-screen synchronization application sent from the second electronic device in a case where the second electronic device runs the cross-screen synchronization application in the foreground.

The data receiving module 302 may be configured to: receive first to-be-synchronized data generated by the cross-screen synchronization application and sent from the second electronic device based on the first data acquisition request.

The data synchronization module may be configured to: synchronize the first to-be-synchronized data to a synchronization application on the first electronic device that corresponds to the cross-screen synchronization application.

In some embodiments, the apparatus 300 for processing information may further include an operation receiving module. The operation receiving module may be configured to: receive a touch operation applied on a cross-screen icon of a cross-screen application, where the cross-screen icon is an icon of the cross-screen application sent from the second electronic device in a case where the second electronic device runs the cross-screen icon on the foreground; and determining that the touch operation applied on the cross-screen synchronization icon of the cross-screen synchronization application is received, in a case where a local application corresponding to the cross-screen application exists on the first electronic device.

In some embodiments, the operation receiving module may be configured to: determine that the touch operation applied on the cross-screen projection icon of the cross-screen projection application is received, in a case where a local application corresponding to the cross-screen application does not exist on the first electronic device and the cross-screen application does not support a browser synchronization mode.

In some embodiments, a data sending module may be configured to: send a second data acquisition request to the second electronic device, in a case where a local application corresponding to the cross-screen application does not exist on the first electronic device and the cross-screen application supports a browser synchronization mode.

The data receiving module 302 may be configured to: receive second to-be-synchronized data generated by the cross-screen application and sent from the second electronic device based on the second data acquisition request.

The data synchronization module may be configured to: synchronize the second to-be-synchronized data to a browser on the first electronic device.

In some embodiments, the apparatus 300 for processing information may further include an application launching module and a data display module. The application launching module may be configured to: launch the synchronization application, in response to the touch operation applied on the cross-screen synchronization icon of the cross-screen synchronization application.

The data display module may be configured to: display the first to-be-synchronized data through the application interface of the synchronization application.

In some embodiments, the apparatus 300 for processing information may further include an icon display module and a data processing module. The icon display module may be configured to: display a relay on hold icon and start time-keeping, where the relay on hold icon is an icon of a relay on hold application sent from the second electronic device in a case where the second electronic device launches the relay on hold application; and hide the relay on hold icon and receive application data generated by the relay on hold application and sent from the second electronic device, in a case where the timekeeping reaches a preset duration.

The data processing module may be configured to: process the application data.

Figure 9:
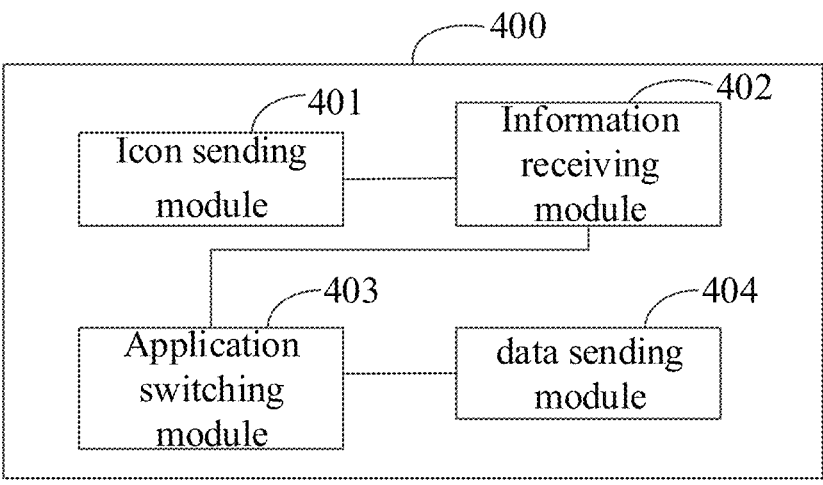
FIG. 9 is a structural block diagram of another apparatus for processing information in some embodiments of the present disclosure.

As shown in FIG. 9, FIG. 9 is a structural block diagram of another apparatus for processing information in some embodiments of the present disclosure. An apparatus 400 for processing information may be configured in the second electronic device and may include: an icon sending module 401, an information receiving module 402, an application switching module 403, and a data sending module 404.

The icon sending module 401 may be configured to send a cross-screen projection icon of a cross-screen projection application running in foreground to a first electronic device.

The information receiving module 402 may be configured to receive switching indication information sent from the first electronic device. The switching indication information is information sent from the first electronic device in response to a touch operation applied on the cross-screen projection icon and is configured to indicate the second electronic device to switch the cross-screen projection application from running in the foreground to running in background.

The application switching module 403 may be configured to switch the cross-screen projection application from running in the foreground to running in the background.

The data sending module 404 may be configured to send screen projection data generated by the cross-screen projection application to the first electronic device through a screen projection channel, enabling the first electronic device to play the screen projection data. The screen projection channel is established by the first electronic device in response to the touch operation applied on the cross-screen projection icon.

Some embodiments of the present disclosure further provide a computer-readable storage medium that stores a computer program. When the computer program is executed by a computer, the computer is caused to perform the method for processing information provided by some embodiments of the present disclosure.

Some embodiments of the present disclosure further provide an electronic device that includes a memory and a processor. When a computer program stored in the memory is executed by the processor, the processor is caused to perform the method for processing information provided by some embodiments of the present disclosure.

Figure 10:
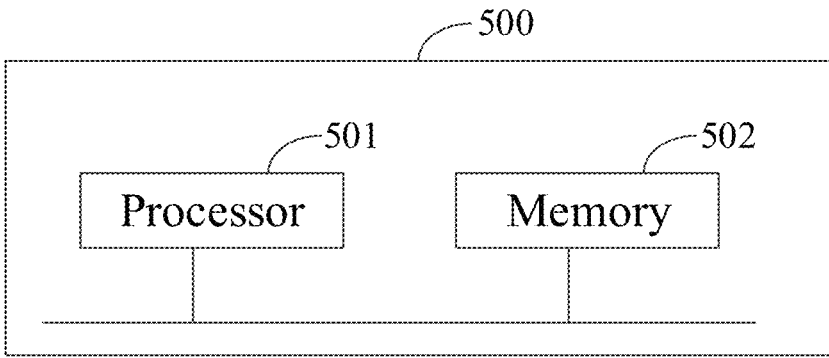
FIG. 10 is a structural block diagram of an electronic device in some embodiments of the present disclosure.

For example, the electronic device mentioned above may be a mobile terminal such as a tablet or a smartphone, etc. As shown in FIG. 10, FIG. 10 is a structural block diagram of an electronic device in some embodiments of the present disclosure.

The electronic device 500 may include components such as a processor 501, a memory 502, and so on. The electronic device 500 may be either the first electronic device or the second electronic device mentioned above. Any skilled in the art can understand that the structure of the electronic device shown in FIG. 10 is not intended to limit the electronic device. The electronic device may include more or fewer components than shown, or certain components may be combined, or different components may be arranged. For example, the electronic device 500 may further include a screen.

The processor 501 is a control center of the electronic device, connecting various parts of the entire electronic device through various interfaces and lines. The processor 501, through running or executing applications stored in the memory 502, and accessing data stored in the memory 502, executes various functions and data processing tasks, thereby providing an overall monitoring of the electronic device.

The memory 502 is configured to store an application and data. The application stored in the memory 502 may include executable code. The application may form various functional modules. The processor 501, through running the application stored in the memory 502, executes various functional applications and data processing tasks.

In the above embodiments, the processor 501 in the electronic device may, according to the following instructions, load the executable code corresponding to one or more application processes into the memory 502 and run the applications stored in the memory 502 to implement the method for processing information described in any of the embodiments of the present disclosure.

In the above embodiments, the descriptions of each embodiment emphasize different aspects. Parts not detailed in a particular embodiment may refer to the detailed descriptions of the method for processing information mentioned earlier, which will not be repeated herein.

The apparatus for processing information provided in some embodiments of the present disclosure is based on the same concept as the method for processing information mentioned in earlier embodiments. Any one of the method embodiments for processing information may be performed on the apparatus for processing information. A specific implementation process is detailed in the method embodiments for processing information and will not be repeated herein.

It should be noted that, for the method for processing information in some embodiments of the present disclosure, any ordinary skilled in the art can understand that the entire or partial process of the method for processing information in some embodiments of the present disclosure may be performed by means of controlling a relevant hardware through a computer program. The computer program may be stored in a computer-readable storage medium, such as in a memory, and executed by at least one processor. The execution of the computer program may include operations described in the embodiments of the method for processing information. The storage medium may include a magnetic disk, an optical disk, a read only memory (ROM), a random access memory (RAM), and so on.

It can be understood that, in some embodiments of the present disclosure, user information, such as application usage behavior data, logs, and other related data, may be involved. When the above embodiments of the present disclosure are applied to particular products or technologies, user consent or approval may be required, and the collection, use, and processing of such data have to comply with the relevant national and regional laws, regulations, and standards.

For the apparatus for processing information in some embodiments of the present disclosure, the functional modules thereof may be integrated into a processing chip, may physically exist as separate modules, or may be combined into one or more modules. The aforementioned integrated modules may be implemented in form of hardware or in form of software functional modules. The integrated modules, when implemented as software functional modules and sold or used as independent products, may be stored in a computer-readable storage medium, such as a read-only memory, a disk, or an optical disk, etc.

The detailed descriptions of the method for processing information, the apparatus for processing information, the storage medium, and the electronic device provided in some embodiments of the present embodiments are illustrated above. Concrete examples are used to explain the principles and implementation methods of some embodiments of the present disclosure. The descriptions of the above embodiments are for the purpose of facilitating the understanding of the methods and core ideas of the disclosure. In addition, for any skilled in the art, the specific implementation methods and application scope can be modified. Therefore, the content of this specification should not be construed as limiting the disclosure.

What is claimed is:

1. A method for processing information, performed by a first electronic device, comprising:

establishing a screen projection channel with a second electronic device and sending switching indication information to the second electronic device, in response to a touch operation applied on a cross-screen projection icon of a cross-screen projection application, wherein the switching indication information is configured to indicate the second electronic device to switch the cross-screen projection application from running in foreground to running in background, and the cross-screen projection icon is an icon of the cross-screen projection application sent from the second electronic device in a case where the second electronic device runs the cross-screen projection application in the foreground;

receiving screen projection data generated by the cross-screen projection application and sent from the second electronic device through the screen projection channel; and playing the screen projection data.

2. The method as claimed in claim 1, further comprising:

sending a first data acquisition request to the second electronic device, in response to a touch operation applied on a cross-screen synchronization icon of a cross-screen synchronization application, wherein the cross-screen synchronization icon is an icon of the cross-screen synchronization application sent from the second electronic device in a case where the second electronic device runs the cross-screen synchronization application in the foreground;

receiving first to-be-synchronized data generated by the cross-screen synchronization application and sent from the second electronic device based on the first data acquisition request; and synchronizing the first to-be-synchronized data to a synchronization application on the first electronic device that corresponds to the cross-screen synchronization application.

3. The method as claimed in claim 2, further comprising:

receiving a touch operation applied on a cross-screen icon of a cross-screen application, wherein the cross-screen icon is an icon of the cross-screen application sent from the second electronic device in a case where the second electronic device runs the cross-screen icon on the foreground; and determining that the touch operation applied on the cross-screen synchronization icon of the cross-screen synchronization application is received, in a case where a local application corresponding to the cross-screen application exists on the first electronic device.

4. The method as claimed in claim 3, wherein after the receiving a touch operation applied on a cross-screen icon of a cross-screen application, further comprises:

determining that the touch operation applied on the cross-screen projection icon of the cross-screen projection application is received, in a case where the local application corresponding to the cross-screen application does not exist on the first electronic device and the cross-screen application does not support a browser synchronization mode.

5. The method as claimed in claim 3, wherein after the receiving a touch operation applied on a cross-screen icon of a cross-screen application, further comprises:

sending a second data acquisition request to the second electronic device, in a case where the local application corresponding to the cross-screen application does not exist on the first electronic device and the cross-screen application supports a browser synchronization mode;

receiving second to-be-synchronized data generated by the cross-screen application and sent from the second electronic device based on the second data acquisition request; and synchronizing the second to-be-synchronized data to a browser on the first electronic device.

6. The method as claimed in claim 2, further comprising:

launching the synchronization application, in response to the touch operation applied on the cross-screen synchronization icon of the cross-screen synchronization application; and after the synchronizing the first to-be-synchronized data to a synchronization application on the first electronic device that corresponds to the cross-screen synchronization application, the method further comprises:

displaying the first to-be-synchronized data through application interface of the synchronization application.

7. The method as claimed in claim 1, further comprising:

displaying a relay on hold icon and starting timekeeping, wherein the relay on hold icon is an icon of a relay on hold application sent from the second electronic device in a case where the second electronic device launches the relay on hold application;

hiding the relay on hold icon and receiving application data generated by the relay on hold application and sent from the second electronic device, in a case where the timekeeping reaches a preset duration; and processing the application data.

8. A non-transitory computer-readable storage medium, storing a computer program which, when executed by a computer, causes the computer to perform the method for processing information;

the method comprises:

establishing a screen projection channel with a second electronic device and sending switching indication information to the second electronic device, in response to a touch operation applied on a cross-screen projection icon of a cross-screen projection application, wherein the switching indication information is configured to indicate the second electronic device to switch the cross-screen projection application from running in foreground to running in background, and the cross-screen projection icon is an icon of the cross-screen projection application sent from the second electronic device in a case where the second electronic device runs the cross-screen projection application in the foreground;

receiving screen projection data generated by the cross-screen projection application and sent from the second electronic device through the screen projection channel; and playing the screen projection data.

9. The non-transitory computer-readable storage medium as claimed in claim 8, wherein the method further comprises:

sending a first data acquisition request to the second electronic device, in response to a touch operation applied on a cross-screen synchronization icon of a cross-screen synchronization application, wherein the cross-screen synchronization icon is an icon of the cross-screen synchronization application sent from the second electronic device in a case where the second electronic device runs the cross-screen synchronization application in the foreground;

receiving first to-be-synchronized data generated by the cross-screen synchronization application and sent from the second electronic device based on the first data acquisition request; and synchronizing the first to-be-synchronized data to a synchronization application on the first electronic device that corresponds to the cross-screen synchronization application.

10. The non-transitory computer-readable storage medium as claimed in claim 9, wherein the method further comprises:

receiving a touch operation applied on a cross-screen icon of a cross-screen application, wherein the cross-screen icon is an icon of the cross-screen application sent from the second electronic device in a case where the second electronic device runs the cross-screen icon on the foreground; and determining that the touch operation applied on the cross-screen synchronization icon of the cross-screen synchronization application is received, in a case where a local application corresponding to the cross-screen application exists on the first electronic device.

11. The non-transitory computer-readable storage medium as claimed in claim 10, wherein after the receiving a touch operation applied on a cross-screen icon of a cross-screen application, the method further comprises:

determining that the touch operation applied on the cross-screen projection icon of the cross-screen projection application is received, in a case where the local application corresponding to the cross-screen application does not exist on the first electronic device and the cross-screen application does not support a browser synchronization mode.

12. The non-transitory computer-readable storage medium as claimed in claim 10, wherein after the receiving a touch operation applied on a cross-screen icon of a cross-screen application, the method further comprises:

sending a second data acquisition request to the second electronic device, in a case where the local application corresponding to the cross-screen application does not exist on the first electronic device and the cross-screen application supports a browser synchronization mode;

receiving second to-be-synchronized data generated by the cross-screen application and sent from the second electronic device based on the second data acquisition request; and synchronizing the second to-be-synchronized data to a browser on the first electronic device.

13. The non-transitory computer-readable storage medium as claimed in claim 9, wherein the method further comprises:

launching the synchronization application, in response to the touch operation applied on the cross-screen synchronization icon of the cross-screen synchronization application; and after the synchronizing the first to-be-synchronized data to a synchronization application on the first electronic device that corresponds to the cross-screen synchronization application, the method further comprises:

displaying the first to-be-synchronized data through application interface of the synchronization application.

14. An electronic device, comprising a processor and a memory, wherein the memory stores a computer program which, when executed by the processor, causes the electronic device as a first electronic device and causes the processor to perform:

establishing a screen projection channel with a second electronic device and sending switching indication information to the second electronic device, in response to a touch operation applied on a cross-screen projection icon of a cross-screen projection application, wherein the switching indication information is configured to indicate the second electronic device to switch the cross-screen projection application from running in foreground to running in background, and the cross-screen projection icon is an icon of the cross-screen projection application sent from the second electronic device in a case where the second electronic device runs the cross-screen projection application in the foreground;

receiving screen projection data generated by the cross-screen projection application and sent from the second electronic device through the screen projection channel; and playing the screen projection data.

15. The electronic device as claimed in claim 14, wherein the processor is configured to perform:

sending a first data acquisition request to the second electronic device, in response to a touch operation applied on a cross-screen synchronization icon of a cross-screen synchronization application, wherein the cross-screen synchronization icon is an icon of the cross-screen synchronization application sent from the second electronic device in a case where the second electronic device runs the cross-screen synchronization application in the foreground;

receiving first to-be-synchronized data generated by the cross-screen synchronization application and sent from the second electronic device based on the first data acquisition request; and synchronizing the first to-be-synchronized data to a synchronization application on the first electronic device that corresponds to the cross-screen synchronization application.

16. The electronic device as claimed in claim 15, wherein the processor is configured to perform:

receiving a touch operation applied on a cross-screen icon of a cross-screen application, wherein the cross-screen icon is an icon of the cross-screen application sent from the second electronic device in a case where the second electronic device runs the cross-screen icon on the foreground; and determining that the touch operation applied on the cross-screen synchronization icon of the cross-screen synchronization application is received, in a case where a local application corresponding to the cross-screen application exists on the first electronic device.

17. The electronic device as claimed in claim 16, wherein the processor is configured to perform:

determining that the touch operation applied on the cross-screen projection icon of the cross-screen projection application is received, in a case where the local application corresponding to the cross-screen application does not exist on the first electronic device and the cross-screen application does not support a browser synchronization mode.

18. The electronic device as claimed in claim 16, wherein after the receiving a touch operation applied on a cross-screen icon of a cross-screen application, the processor is configured to perform:

sending a second data acquisition request to the second electronic device, in a case where the local application corresponding to the cross-screen application does not exist on the first electronic device and the cross-screen application supports a browser synchronization mode;

receiving second to-be-synchronized data generated by the cross-screen application and sent from the second electronic device based on the second data acquisition request; and synchronizing the second to-be-synchronized data to a browser on the first electronic device.

19. The electronic device as claimed in claim 15, wherein the processor is configured to perform:

launching the synchronization application, in response to the touch operation applied on the cross-screen synchronization icon of the cross-screen synchronization application; and after the synchronizing the first to-be-synchronized data to a synchronization application on the first electronic device that corresponds to the cross-screen synchronization application, the processor is further configured to perform:

displaying the first to-be-synchronized data through application interface of the synchronization application.

20. The electronic device as claimed in claim 14, wherein the processor is configured to perform:

displaying a relay on hold icon and starting timekeeping, wherein the relay on hold icon is an icon of a relay on hold application sent from the second electronic device in a case where the second electronic device launches the relay on hold application;

hiding the relay on hold icon and receiving application data generated by the relay on hold application and sent from the second electronic device, in a case where the timekeeping reaches a preset duration; and processing the application data.

\* \* \* \* \*